(12) United States Patent
Chaponniere et al.

(10) Patent No.: US 12,200,611 B2
(45) Date of Patent: Jan. 14, 2025

(54) TECHNIQUES FOR PREVENTING OVERLOADING OF PUBLIC LAND MOBILE NETWORK (PLMN) SUBJECT TO DISASTER

(71) Applicant: QUALCOMM Incorporated, San Diego, CA (US)

(72) Inventors: Lenaig Genevieve Chaponniere, La Jolla, CA (US); Sunghoon Kim, San Diego, CA (US); Amer Catovic, San Diego, CA (US); Sitaramanjaneyulu Kanamarlapudi, San Diego, CA (US); Haris Zisimopoulos, London (GB); Waqar Zia, Munich (DE); Sebastian Speicher, Wallisellen (CH)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/453,214

(22) Filed: Nov. 2, 2021

(65) Prior Publication Data

US 2022/0141758 A1 May 5, 2022

Related U.S. Application Data

(60) Provisional application No. 63/110,131, filed on Nov. 5, 2020.

(51) Int. Cl.
*H04W 48/16* (2009.01)
*H04W 8/26* (2009.01)
(Continued)

(52) U.S. Cl.
CPC ............. *H04W 48/16* (2013.01); *H04W 8/26* (2013.01); *H04W 60/04* (2013.01); *H04W 60/06* (2013.01); *H04W 84/042* (2013.01)

(58) Field of Classification Search
CPC ....... H04W 48/16; H04W 8/26; H04W 60/04; H04W 60/06; H04W 84/042
See application file for complete search history.

(56) References Cited

U.S. PATENT DOCUMENTS

2014/0134984 A1* 5/2014 Mufti ...................... H04W 4/70
455/414.1
2016/0127884 A1* 5/2016 Kim ...................... H04W 60/04
455/435.2
(Continued)

FOREIGN PATENT DOCUMENTS

WO 2014165109 A1 10/2014
WO 2020141965 A1 7/2020

OTHER PUBLICATIONS

3GPP TR 24.811: "3rd Generation Partnership Project; Technical Specification Group Core Network and Terminals; Study on the Support for Minimization of Service Interruption; (Release 17)", 3GPP Standard, Technical Report, 3GPP TR 24.811, 3rd Generation Partnership Project (3GPP), Mobile Competence Centre, 650, Route Des Lucioles, F-06921, Sophia-Antipolis Cedex, France, vol. No. V17.1.0, Sep. 25, 2021 (Sep. 25, 2021), pp. 1-112, XP052056826.
(Continued)

*Primary Examiner* — Wayne H Cai
(74) *Attorney, Agent, or Firm* — Guang Y. Zhang; Patterson & Sheridan LLP

(57) ABSTRACT

Certain aspects of the subject matter described in this disclosure can be implemented in a method for wireless communication by a user equipment (UE). The method generally includes registering with a first public land mobile network (PLMN) of a first network operator in response to detection of an interruption event associated with a second PLMN of a second network operator; determining that the interruption event has ended; and taking one or more actions to communicate with the second PLMN in response to the
(Continued)

ending of the interruption event, wherein taking the one or more actions to communicate with the second PLMN is based on a constraint associated with access attempts to the second PLMN.

30 Claims, 10 Drawing Sheets

(51) Int. Cl.
*H04W 60/04* (2009.01)
*H04W 60/06* (2009.01)
*H04W 84/04* (2009.01)

(56) References Cited

U.S. PATENT DOCUMENTS

2021/0112620 A1* 4/2021 Yin .................. H04W 8/08
2022/0272651 A1* 8/2022 Chun ................ H04W 60/06
2023/0254733 A1* 8/2023 Park ................. H04W 28/0289
370/229

OTHER PUBLICATIONS

3GPP TS 22.261: "3rd Generation Partnership Project; Technical Specification Group Services and System Aspects; Service Requirements for the 5G System; Stage 1 (Release 18)", 3GPP Standard, Technical Specification; 3GPP TS 22.261, 3rd Generation Partnership Project (3GPP), Mobile Competence Centre, 650, Route Des Lucioles, F-06921 Sophia-Antipolis Cedex, France, vol. SA WG1, No. V18.0.0, Oct. 4, 2020 (Oct. 4, 2020), 84 Pages, XP051961376. International Search Report and Written Opinion—PCT/US2021/072202—ISA/EPO—Mar. 2, 2022.

* cited by examiner

TECHNIQUES FOR PREVENTING OVERLOADING OF PUBLIC LAND MOBILE NETWORK (PLMN) SUBJECT TO DISASTER

CROSS-REFERENCE TO RELATED APPLICATIONS

The present application claims benefit of and priority to U.S. Provisional Patent Application Ser. No. 63/110,131, filed Nov. 5, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for network registration.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved network registration techniques.

Certain aspects of the subject matter described in this disclosure can be implemented in a method for wireless communication by a user equipment (UE). The method generally includes registering with a first public land mobile network (PLMN) of a first network operator in response to detection of an interruption event associated with a second PLMN of a second network operator; determining that the interruption event has ended; and taking one or more actions to communicate with the second PLMN in response to the ending of the interruption event, wherein taking the one or more actions to communicate with the second PLMN is based on a constraint associated with access attempts to the second PLMN.

Certain aspects of the subject matter described in this disclosure can be implemented in a method for wireless communication by a network entity. The method generally includes registering a plurality of UEs with a first PLMN of a first network operator due to an interruption event associated with a second PLMN of a second network operator; determining that the interruption event has ended; and taking one or more actions to facilitate registration of the plurality of UEs with the second PLMN in response to the ending of the interruption event, wherein taking the one or more actions to facilitate the registration of the plurality of UEs is based on a constraint associated with access attempts to the second PLMN.

Certain aspects of the subject matter described in this disclosure can be implemented in a method for wireless communication by a network entity. The method generally includes determining that an interruption event associated with a first PLMN of a first network operator has ended; and taking one or more actions to register a plurality of UEs with the first PLMN in response to the ending of the interruption event, wherein the plurality of UEs have registered with at least one second PLMN of a second network operator due to the interruption event, and wherein the one or more actions to register the plurality of UEs with the first PLMN is based on a constraint associated with access attempts to the first PLMN.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
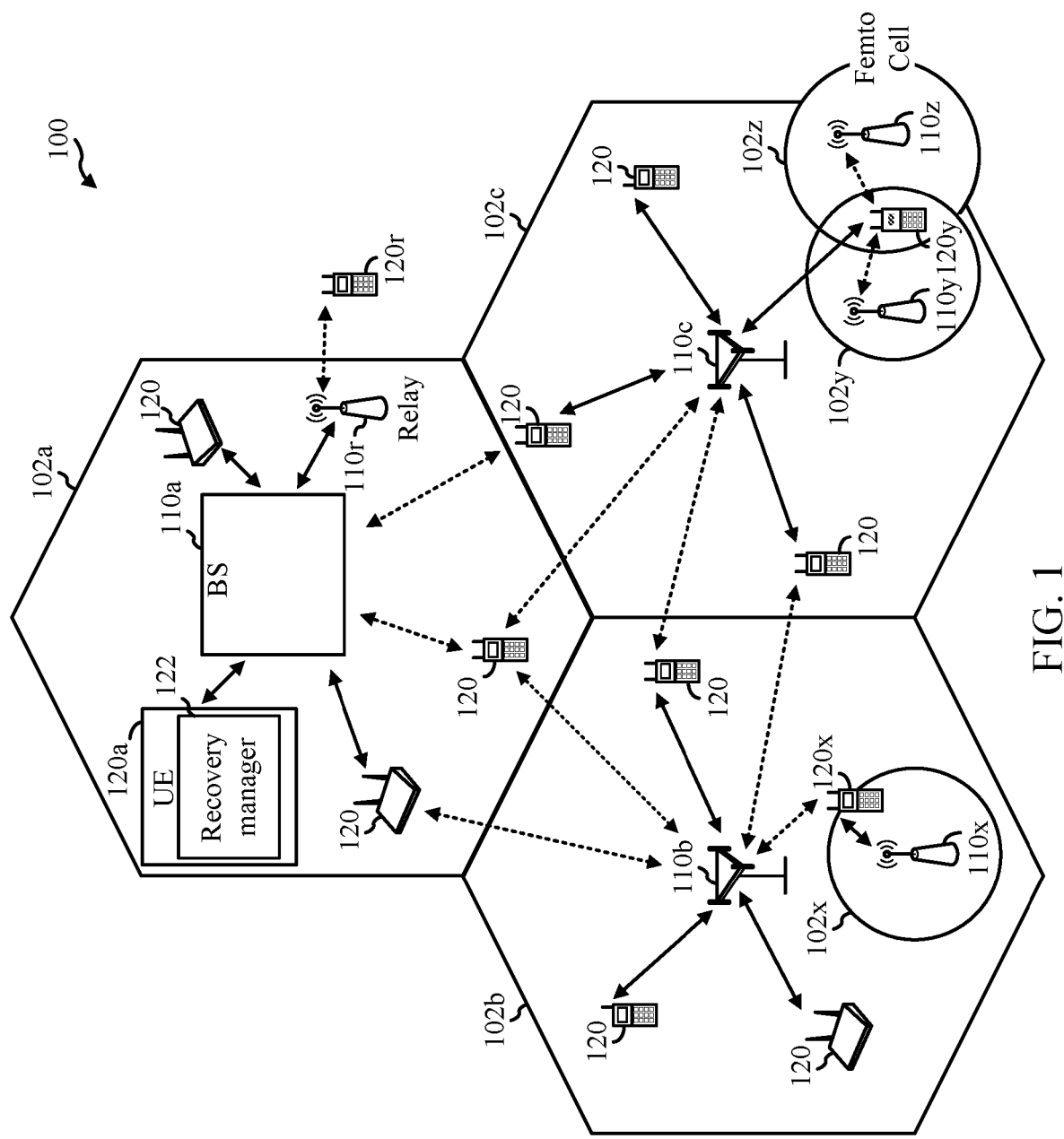
FIG. 1 is a block diagram conceptually illustrating an example wireless communication network, in accordance with certain aspects of the present disclosure.
Figure 1:
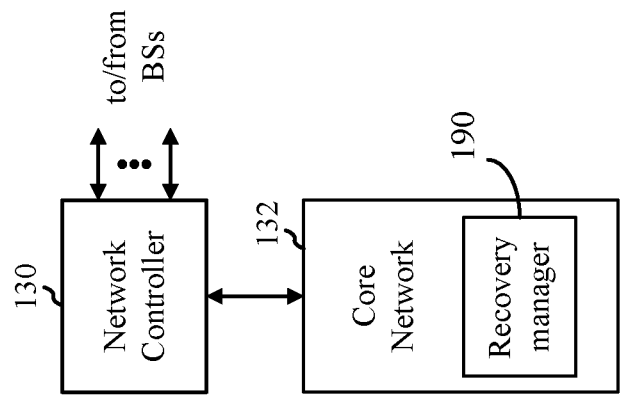

Aspects of the present disclosure provide apparatus, methods, processing systems, and computer readable mediums for network recovery. For example, in some scenarios, a home public land mobile network (PLMN) of user equipments (UEs) may experience an interruption event (e.g., fire) that prevents the PLMN from providing service to the UEs. In response, the UEs may obtain service from another PLMN of another operator. Once the interruption event has ended, the UEs may return to the home PLMN for service at approximately the same time, causing an overload of the home PLMN. Certain aspects of the present disclosure are directed to techniques for preventing the overloading of the home PLMN. For example, the redirection of the UEs back to the home PLMN may be staggered. This staggering of the redirection of the UEs back to the home PLMN may be controlled at the UEs, by the home PLMN, or by the other PLMNs of the other operators. For example, each of the UEs may determine a time at which to reregister with the home PLMN based on a random value in an attempt to facilitate redirection of the UEs back to the home PLMN at different times. In some aspects, the UEs may be informed (e.g., by the home PLMN or the other PLMNs of the other operators) that the interruption event has ended at different times such that the UEs attempt reregistration with the home PLMN at different times, as described in more detail herein.

The following description provides examples of network recovery in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave (mmW), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the UEs 120 may be configured for network recovery. As shown in FIG. 1, the UE 120a includes a recovery manager 122 that manages redirection back to a home PLMN, in accordance with aspects of the present disclosure. As shown, the core network 130 may include a recovery manager 190 for managing redirection of UEs back to a home PLMN.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
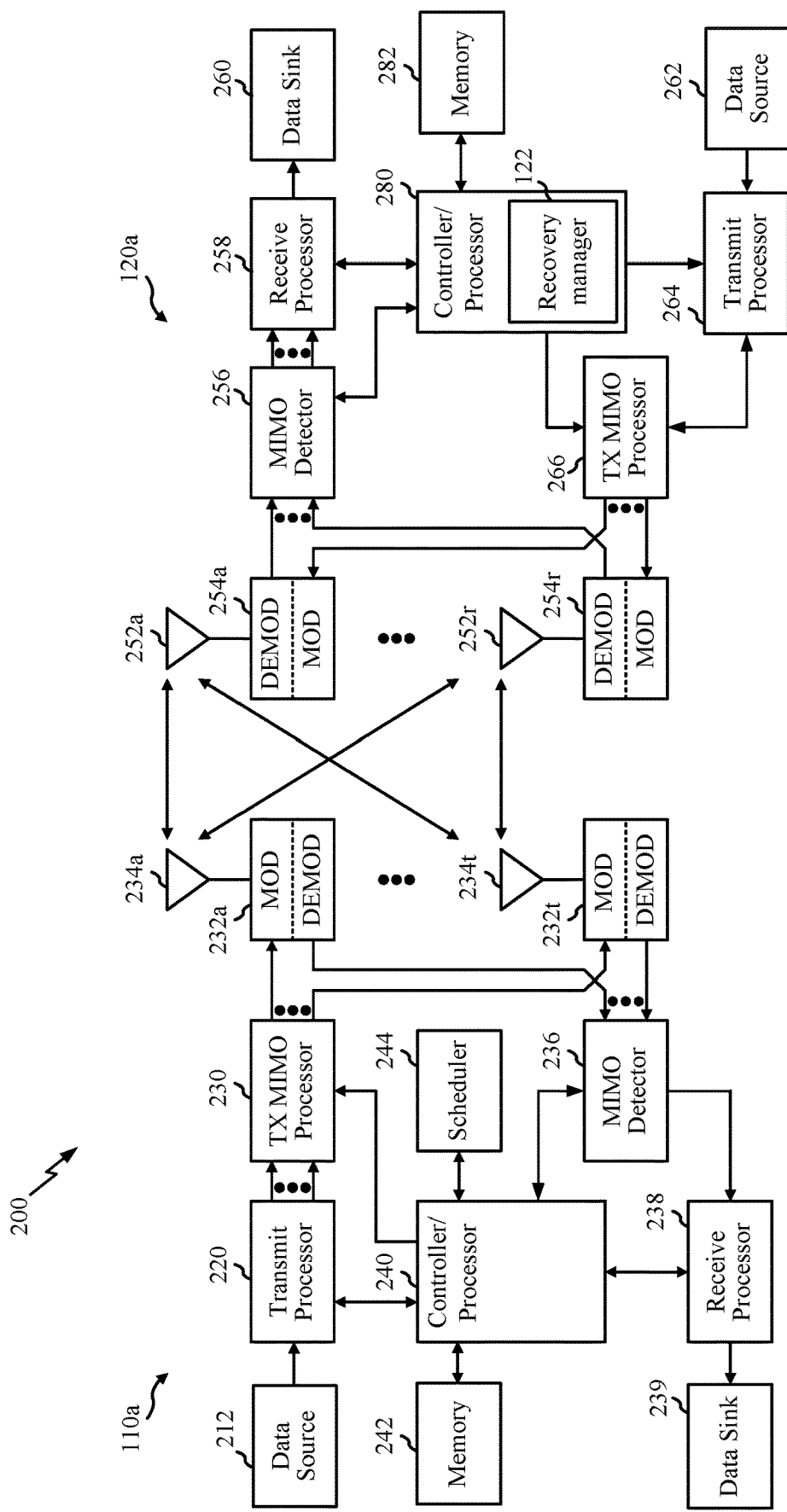
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has the recovery manager 122, according to aspects described herein. Although shown at the controller/processor, other components of the UE 120a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
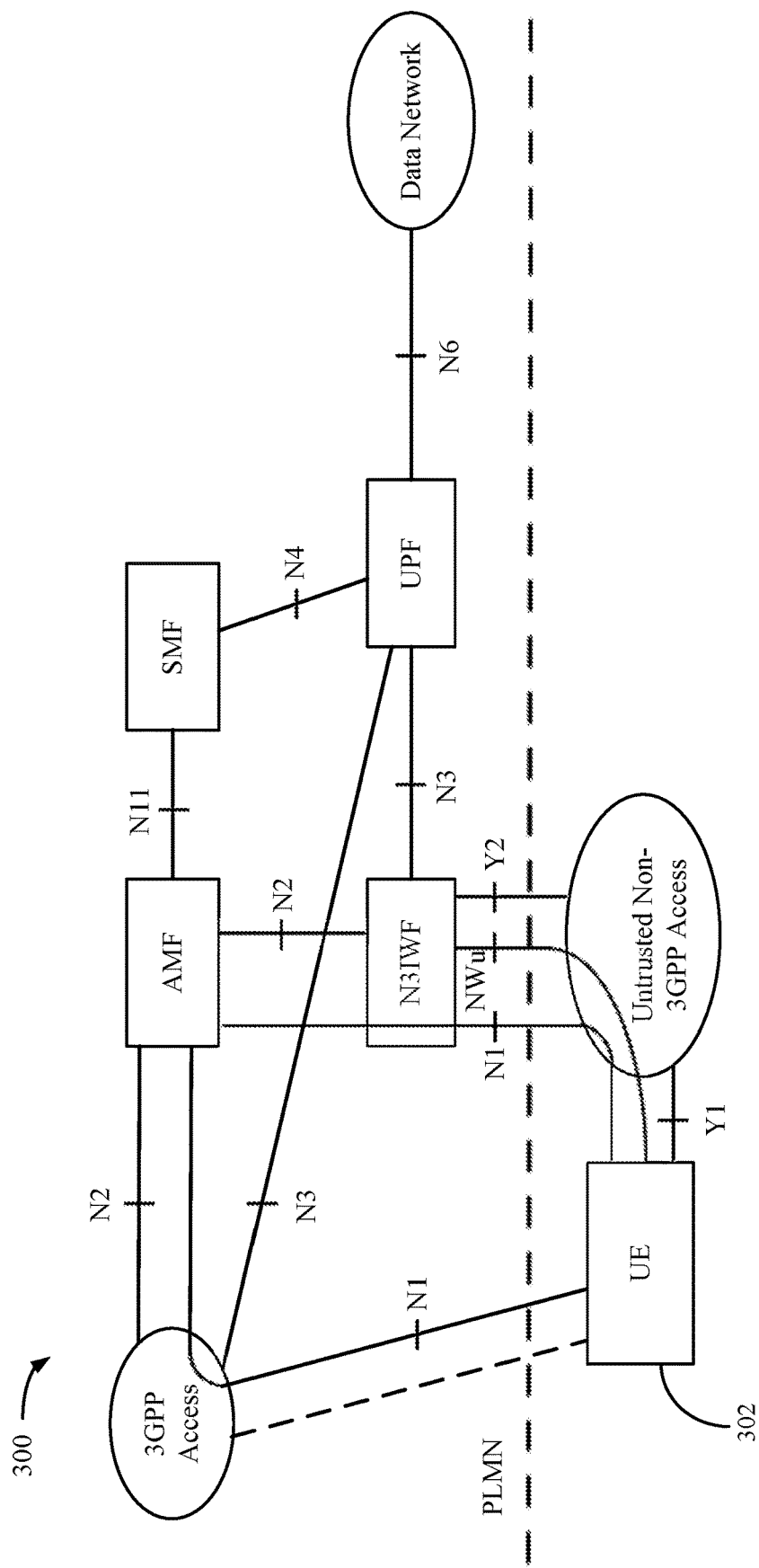
FIG. 3 illustrates an example wireless communication network in which certain aspects of the present disclosure may be implemented.

FIG. 3 illustrates an example wireless communication network 300 in which certain aspects of the present disclosure may be implemented. As illustrated, a UE 302 may access the network using a 3GPP access or non-3GPP access. For example, a public land mobile network (PLMN) may include a non-3GPP interworking function (N3IWF) to facilitate network registration using the non-3GPP access. As illustrated, the PLMN may also include an access and mobility management function (AMF), session management function (SMF), and user-plane function (UPF) that facilitate connection to a data network, as illustrated. The PLMN may be implemented for a specific network operator. Each operator may have a PLMN as described with respect to FIG. 3.

Example Techniques for Preventing Overloading of Public Land Mobile Network (PLMN) Subject to Disaster Certain aspects of the present disclosure are directed to techniques for reducing service interruption. In some cases, an operator's network may experience an interruption event, such as a disaster (e.g., fire) that brings down the operator's network. Thus, subscribers from the operator experiencing the interruption event may be allowed to use another operator's public land mobile network (PLMN). In other words, when a disaster occurs, subscribers from an operator subject to disaster may be notified and attempt to obtain service on other operators' networks available in the same location. A disaster condition may apply due to a natural or accidental disaster (e.g., earthquake, fire) that causes a mobile network to be unable to provide regular service to its subscribers. Disaster inbound roamers generally refer to subscribers (e.g., UEs) from the network subject to the disaster, which try to register on other networks.

In some implementations, a new access identity may be introduced to facilitate disaster inbound roamers to perform an access attempt on a PLMN that is not subject to disaster. For example, an access identity number 3 may be allocated for a UE for which disaster condition applies. That is, the configuration may be valid for PLMNs that indicate to potential disaster inbound roamers that the UEs can access the PLMN.

There are various possible issues with regards to allowing UEs that have experienced interruption events due to disasters of their home PLMN to use PLMNs of other network providers. For example, it should be determined how subscribers are to be notified that a disaster condition applies. A PLMN subject to disaster may not be able to notify their own subscribers and subscribers may not look for other PLMNs unless they go out of coverage or the subscribers know that a disaster condition applies. It should also be agreed how other PLMNs (e.g., PLMNs that are not subject to disaster) are notified that a disaster condition applies or that the disaster condition no longer applies. For example, a PLMN subject to disaster may not be able to notify other PLMNs, and notification may come from another entity. It should also be agreed how other PLMNs indicate they can accept disaster inbound roamers, and how other PLMNs authenticate disaster inbound roamers. For example, using a null algorithm may not be acceptable to provide regular service, and a PLMN subject to disaster may be unreachable. Thus, pre-shared information about disaster inbound roamers may be used.

It should also be determined how disaster inbound roamers are notified that the disaster condition no longer applies, and how to ensure one PLMN failure does not lead to signaling overload in other PLMNs. For example, as described herein, disaster inbound roamers may use a new access identity. Based on operator policy, the 5G system may prevent UEs from accessing the network using relevant barring parameters that vary depending on access identity. However, access identity provides an ON/OFF (bitmap-based) type of access control (e.g., bars all inbound roamers, or none). Thus, a more granular access control may be implemented to prevent overload of other PLMNs. Similarly, it should be determined how to avoid returning UEs overloading the PLMN that had earlier failed. In other words, all disaster inbound roamers returning at once to the home PLMN that was previously subject to disaster could overload the PLMN. Certain aspects of the present disclosure are directed techniques for preventing overloading of the PLMN subject to disaster upon recovery. For example, certain aspects are directed to mechanism(s) for enabling a phased-in return of disaster inbound roamers.

Figure 4:
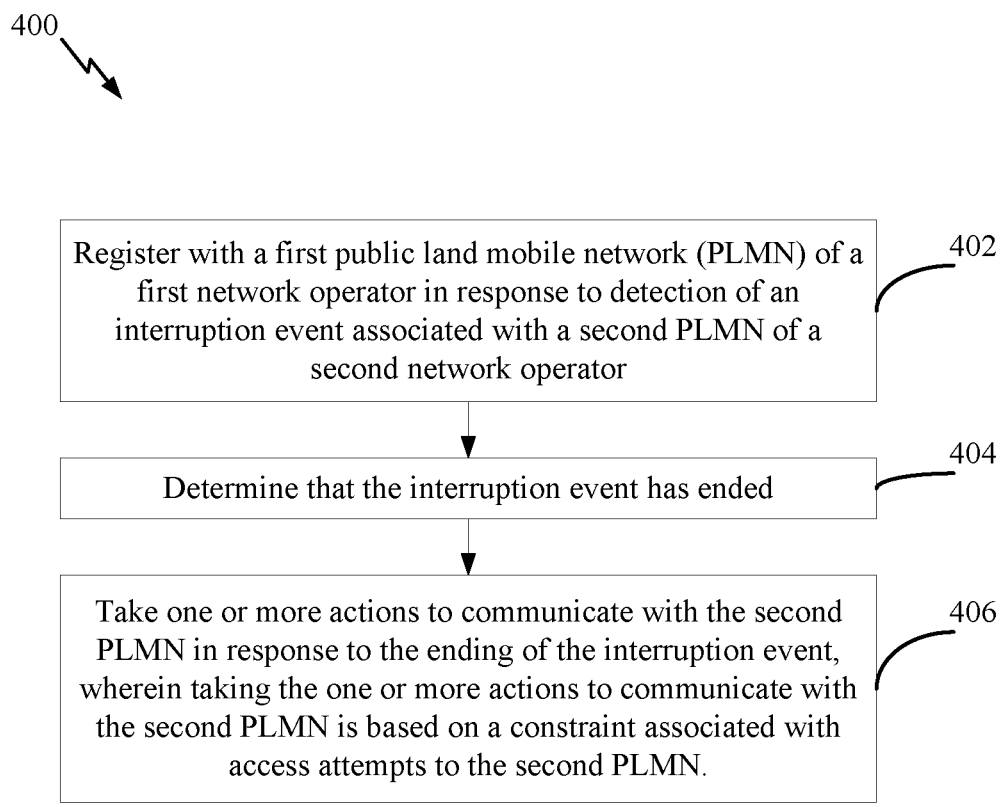
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as the UE 120a in the wireless communication network 100). The UE may be a disaster inbound roamer due to a home PLMN of the UE experiencing an interruption event (e.g., disaster event).

The operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 402, with the UE registering with a first PLMN of a first network operator in response to detection of an interruption event associated with a second PLMN (e.g., a home PLMN of the UE) of a second network operator. At block 404, the UE determines that the interruption event has ended, and at block 406, takes one or more actions to communicate with the second PLMN in response to the ending of the interruption event. In some aspects of the present disclosure, taking the one or more actions to communicate with the second PLMN is based on a constraint associated with access attempts to the second PLMN.

In some aspects, the UE may receive an indication of barred access attempts to the second PLMN. In this case, the one or more actions may include determining to forgo the barred access attempts.

In some aspects, the one or more actions may include transmitting a request for registration with the second PLMN, and receiving a rejection of the request. Receiving the rejection of the request may include receiving a back-off timer indicating a period during which another request for registration is to be deferred.

In some aspects, taking the one or more actions based on the constraint may include waiting a randomized amount of time before attempting to register on the second PLMN. For example, waiting the randomized amount of time may be based on a hash function applied to an international mobile subscriber identity (IMSI) of the UE.

Figure 5:
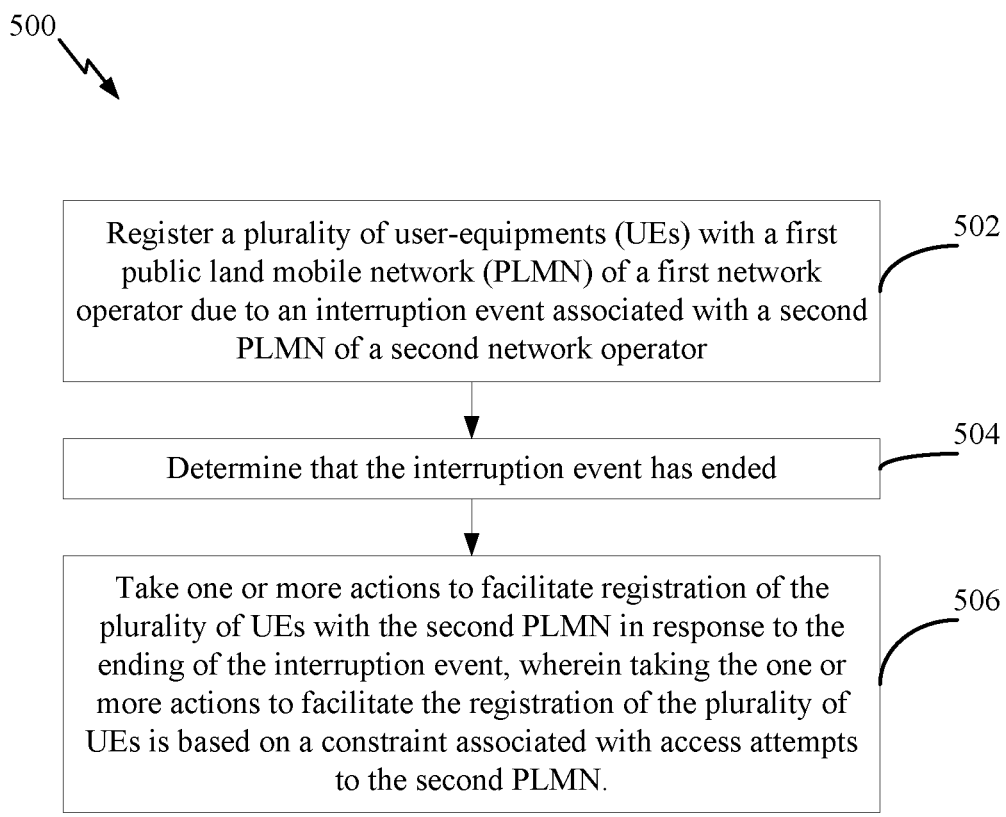
FIG. 5 is a flow diagram illustrating example operations for wireless communication by a first network entity, in accordance with certain aspects of the present disclosure.

FIG. 5 is a flow diagram illustrating example operations 500 for wireless communication, in accordance with certain aspects of the present disclosure. The operations 500 may be performed, for example, by a network entity such as a PLMN entity as described with respect to FIG. 3. The network entity may include a PLMN entity hosting disaster inbound roamers.

Figure 9:
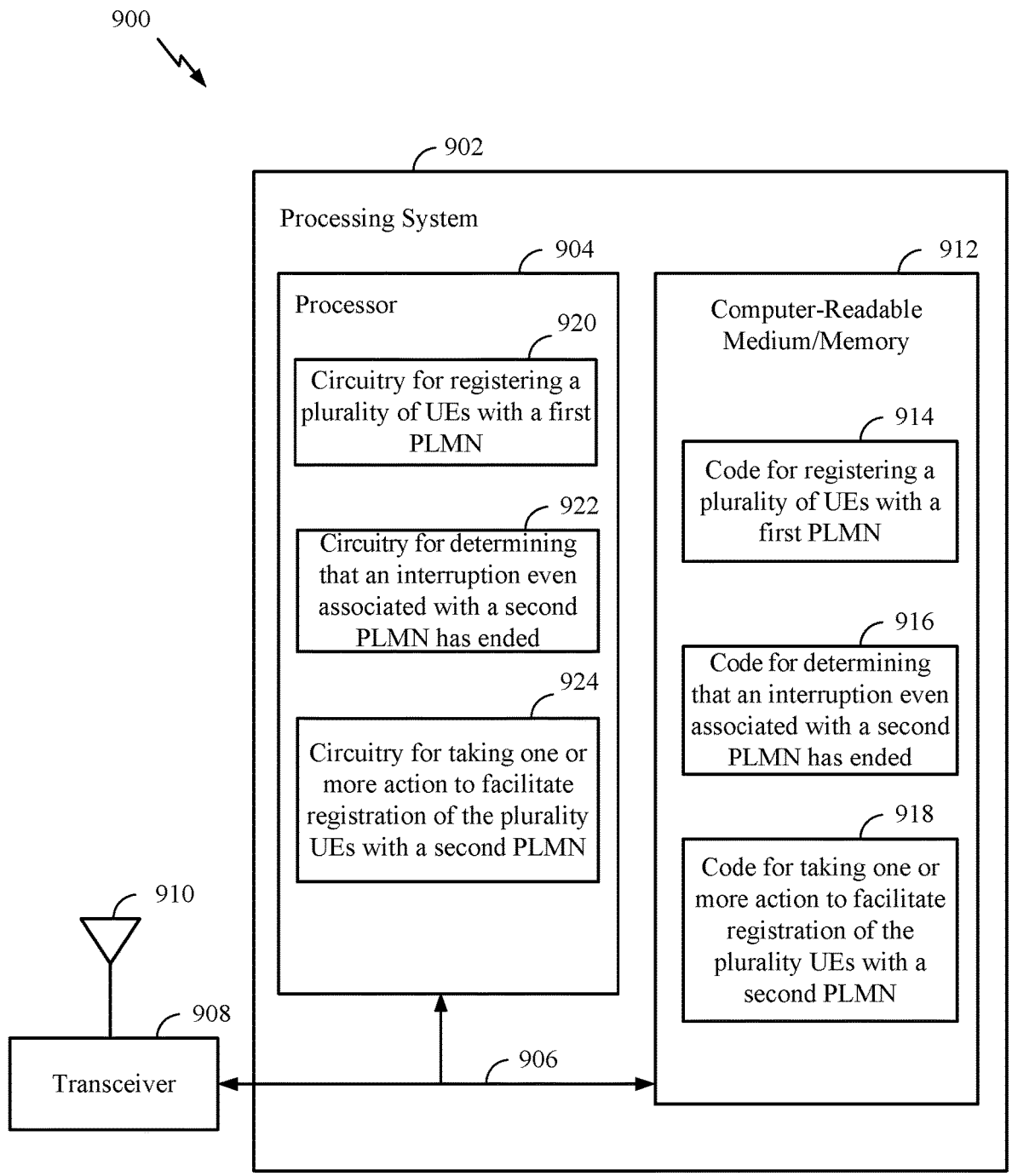

The operations 500 may be implemented as software components that are executed and run on one or more processors (e.g., processor 904 of FIG. 9). Further, the transmission and reception of signals to a UE may be facilitated by a BS in communication with the network entity, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at block 502, by the network entity registering a plurality of UEs with a first PLMN of a first network operator due to an interruption event associated with a second PLMN (e.g., home PLMN) of a second network operator. At block 504, the network entity determines that the interruption event has ended. For example, determining that the interruption event has ended may include receiving, from the second PLMN, an indication that the interruption event has ended.

At block 506, the network entity takes one or more actions to facilitate registration of the plurality of UEs with the second PLMN in response to the ending of the interruption event. Taking the one or more actions to facilitate the registration of the plurality of UEs may be based on a constraint associated with access attempts to the second PLMN.

In some aspects, taking the one or more actions to facilitate the registration based on the constraint may include transmitting indications (e.g., indications that the interruption event has ended) to the plurality of UEs at different times. For example, taking the one or more actions may include determining a random time when an indication that the interruption event has ended to the plurality of UEs is to be transmitted, and transmit the indication that the interruption event has ended at the determined random time.

In some aspects, taking the one or more actions to facilitate the registration based on the constraint may include transmitting deregistration request messages to the plurality of UEs at different times. Each of the deregistration request messages may include a flag set to indicate that reregistration with the second PLMN is required.

Figure 6:
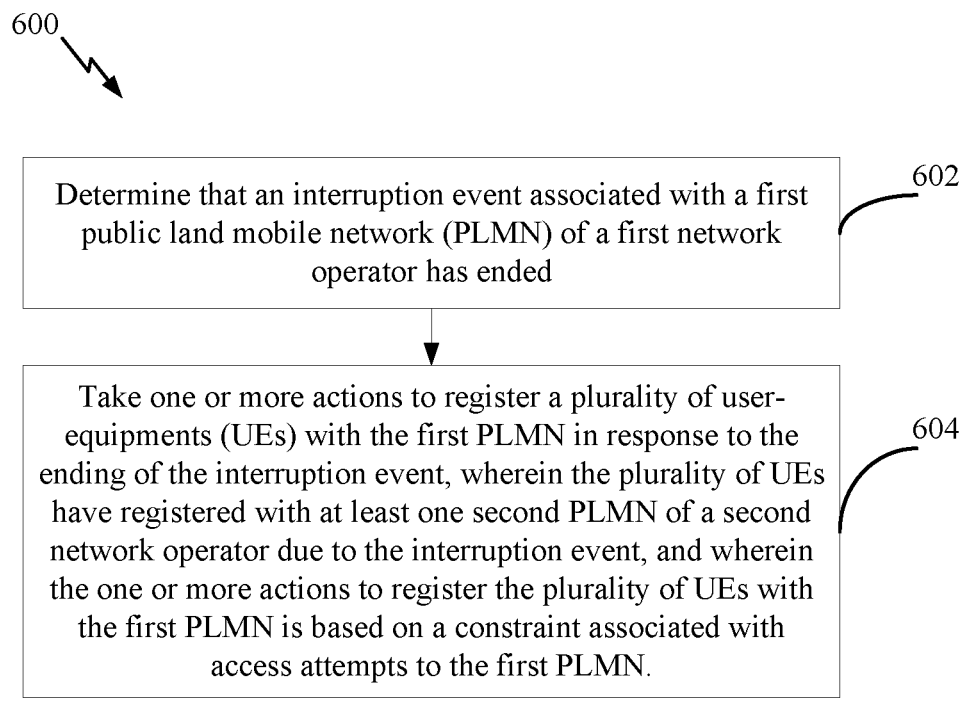
FIG. 6 is a flow diagram illustrating example operations for wireless communication by a second network entity, in accordance with certain aspects of the present disclosure.

FIG. 6 is a flow diagram illustrating example operations 600 for wireless communication, in accordance with certain aspects of the present disclosure. The operations 600 may be performed, for example, by a network entity such as a PLMN entity as described with respect to FIG. 3. The network entity may include a recovered PLMN entity (e.g., a PLMN entity that has experienced an interruption event).

Figure 10:
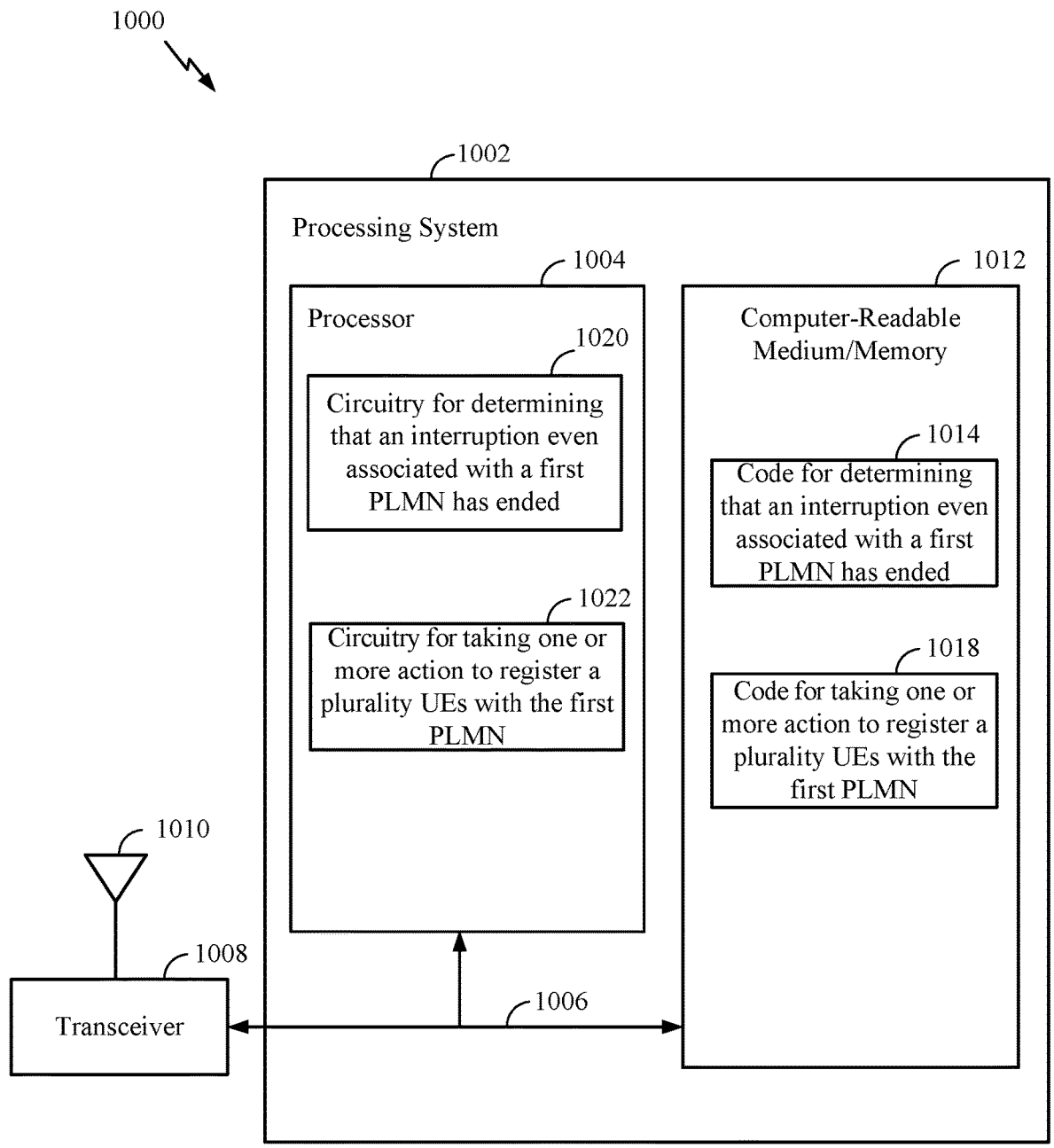

The operations 600 may be implemented as software components that are executed and run on one or more processors (e.g., processor 1004 of FIG. 10). Further, the transmission and reception of signals to a UE may be facilitated by a BS in communication with the network entity, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 602, by the network entity determining that an interruption event associated with a first PLMN (e.g., a home PLMN of a plurality of UEs) of a first network operator has ended. At block 604, the network entity takes one or more actions to register a plurality of UEs with the first PLMN in response to the ending of the interruption event. The plurality of UEs may have registered with at least one second PLMN of a second network operator due to the interruption event. The one or more actions to register the plurality of UEs with the first PLMN may be based on a constraint associated with access attempts to the first PLMN.

In some actions, the one or more actions to register the plurality of UEs based on the constraint may include transmitting an indication of barred access attempts. In some aspects, the one or more actions to register the plurality of UEs based on the constraint comprises receiving a request for registration with the first PLMN, and transmitting a rejection of the request due to the constraint. In some aspects, transmitting the rejection of the request may include transmitting a back-off timer indicating a period during which another request for registration is to be deferred.

In some aspects, the at least one second PLMN may include a plurality of PLMNs. In this case, the one or more actions to register the plurality of UEs based on the constraint may include sending an indication that the interruption event has ended to each of the plurality of PLMNs at different times.

Figure 7A:
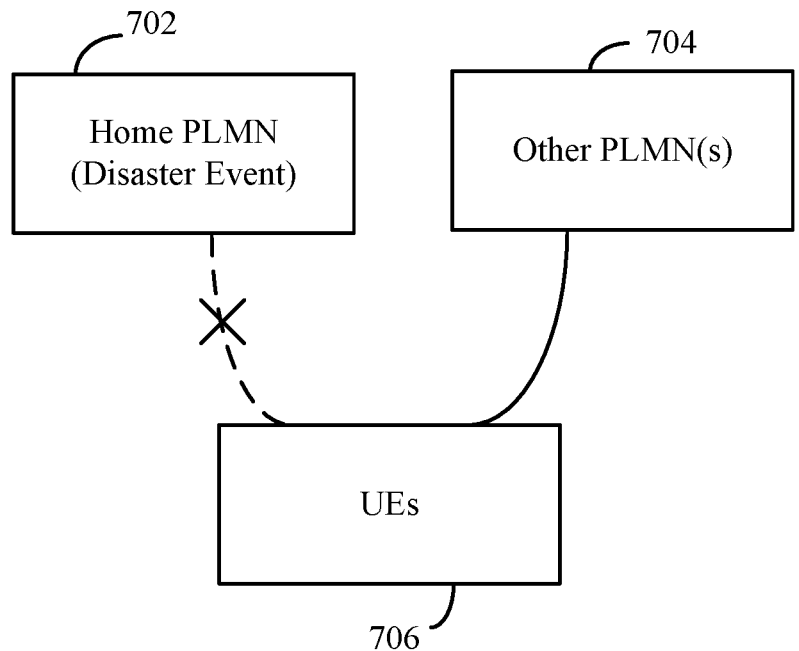
FIGS. 7A and 7B illustrate techniques for recovery of a home network, in accordance with certain aspects of the present disclosure.
Figure 7B:
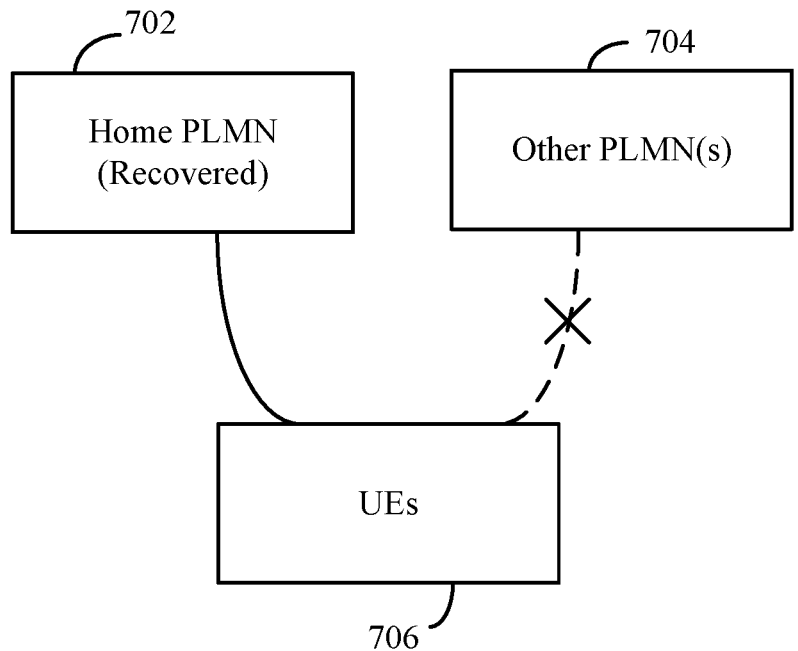

FIGS. 7A and 7B illustrate techniques for recovery of a home PLMN (e.g., also referred to as a recovered PLMN), in accordance with certain aspects of the present disclosure. As illustrated in FIG. 7A, the PLMN 702 may experience a disaster event, resulting in loss of service for UEs 706 (also referred to as disaster inbound roamers). The UEs may then register with and obtain service from one or more other PLMNs 704. Once the PLMN 702 is recovered, as illustrated in FIG. 7B, the UEs 706 may deregister from the one or more other PLMNs 704 and reestablish connection with the recovered PLMN 702. The reestablishment of the connection with the recovered PLMN may be performed in a manner to avoid overloading the PLMN 702, as described herein.

In some aspects, a recovered PLMN (e.g., PLMN 702) may use access control and congestion control mechanisms to prevent overloading of the PLMN. For example, a unified access control (UAC) mechanism may be used. The UAC mechanism involves barring various types of access attempts to the network such as data that is not voice or video, short message service (SMS), etc.

In some aspects, a congestion control mechanism may be used to avoid overloading the PLMN 702. For example, the network (e.g., PLMN 702) may reject a UE's registration request with a 5G mobility management (5GMM) cause value and a back-off timer. 5GMM procedures are responsible for keeping track of whereabouts of UEs. A 5GMM cause value may indicate a cause for the rejection of the UE's registration request. The rejection of the registration request may include a back-off timer indicating a time during which another request for registration is to be deferred.

When a disaster condition no longer applies, other PLMNs (e.g., the one or more PLMNs 704 serving the UEs 706) may be informed by the recovered PLMN (or an external entity) that the disaster condition has ended. The one or more other PLMNs may inform the UEs (e.g., disaster inbound roamers) that the disaster condition has ended by setting an indicator (e.g., system information block (SIB) flag). Once the UEs are informed that the disaster condition has ended, the UEs may attempt to reregister with the recovered PLMN which may result in overloading of the recovered PLMN.

In some aspects, in an attempt to prevent overloading of the recovered PLMN, setting of the indicator that 7 notifies the UEs 706 that the disaster condition no longer applies may be staggered in time at other PLMNs. For example, the recovered PLMN, or external entity, may notify the other PLMNs that the disaster condition has ended at different times. In other words, where the UEs 706 have registered with multiple PLMNs (e.g., PLMNs 704), the recovered PLMN 702 may inform each of the multiple PLMNs that the disaster condition has ended at different times, resulting in staggering of the registration attempts.

In some aspects, the other PLMNs may wait for a randomized amount of time before setting the indicator to notify the UEs that the disaster condition no longer applies. In other words, transmitting, by each of the PLMNs 704, indication(s) (e.g., that the interruption event has ended) to a respective subset of the UEs 706 may be at different times (e.g., as compared to transmission of one or more other indications from one or more other PLMNs). In other words, each of the multiple PLMNs (e.g., PLMNs 704) that the UEs 706 have registered with may indicate that the disaster condition has ended at a different time by randomizing a time at which the indication is transmitted, facilitating a staggered registration with the PLMN 702.

This approach, while simple, assumes that the disaster inbound roamers have been distributed between available PLMNs (e.g., as opposed to a single PLMN) when migrating away from the PLMN subject to disaster. Moreover, disaster inbound roamers camped on a given PLMN may return to the recovered PLMN at the same time. Since the number of other PLMNs is expected to be small, collision in return times, or return times that are very close in time, is possible.

In some aspects, in an attempt to prevent overloading of the recovered PLMN, upon being notified that the disaster condition no longer applies, the disaster inbound roamers (e.g., UEs 706) may wait for a randomized amount of time before attempting to register on the recovered PLMN. To further spread the return of the UEs in time, the wait time may be based on a hash of the UE's international mobile subscriber identity (IMSI).

In some aspects, the other PLMN (e.g., one or more PLMNs 704) serving the disaster inbound roamers may redirect the disaster inbound roamers one-by-one via a deregistration request message with a 5GMM cause value (e.g., indicating that redirection to the home PLMN is required). For instance, within a PLMN hosting disaster inbound roamers, it can be ensured that the roamers return to the recovered PLMN (e.g., PLMN 702) at different times. This solution may apply to connected mode UEs, as UEs that are not in connected mode may autonomously perform PLMN reselection upon notification that the disaster event has ended. In other words, if UEs that are not in connected mode detect an indication in SIB that the disaster event has ended, the non-connected mode UEs may automatically reselect to the recovered PLMN. However, connected mode UEs may only release connection from a currently serving PLMN as directed by the serving PLMN.

Figure 8:
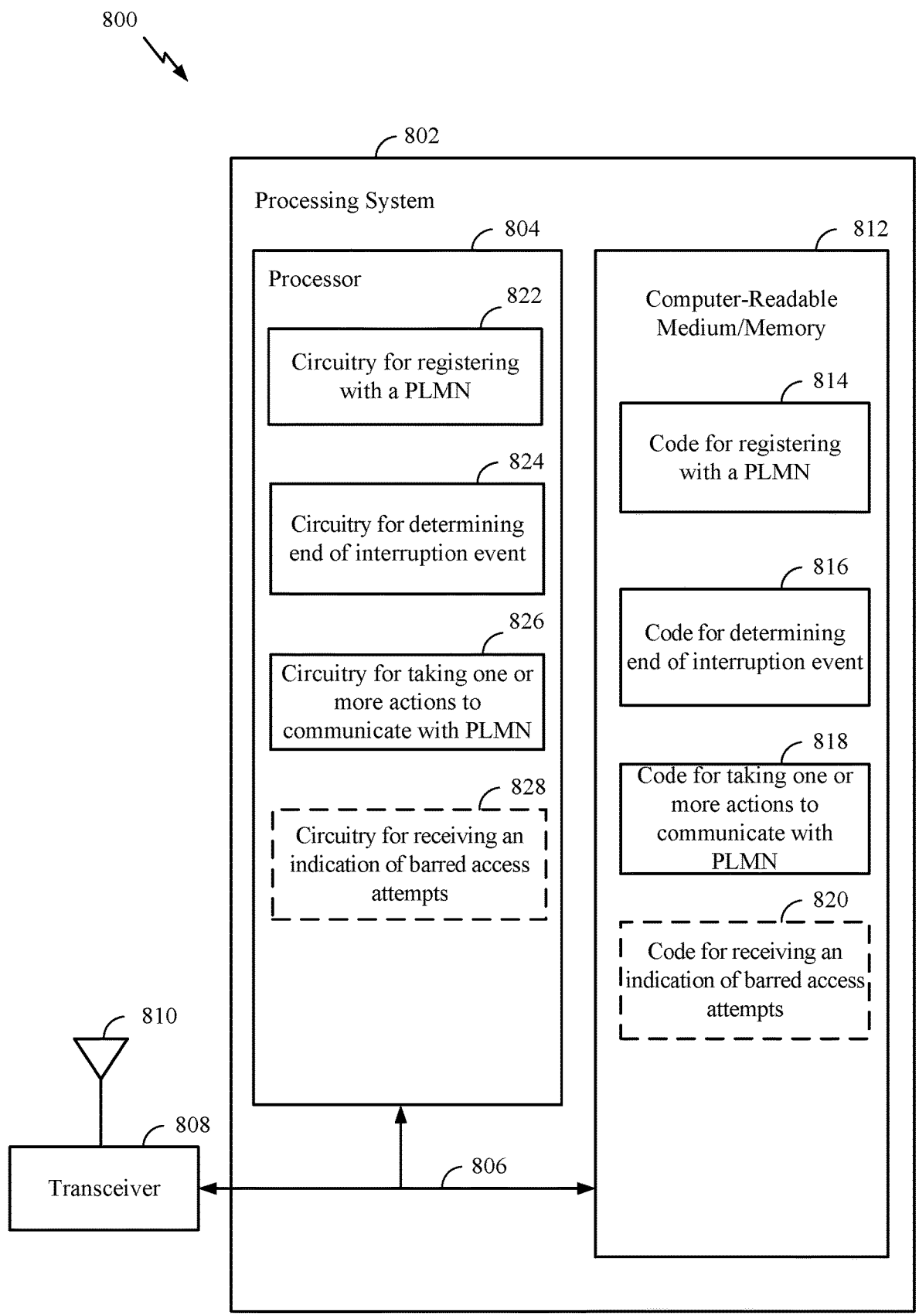
FIGS. 8-10 illustrate communications devices that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 4. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 4, or other operations for performing the various techniques discussed herein for network recovery. In certain aspects, computer-readable medium/memory 812 stores code 814 for registering with a PLMN; code 816 for determining (e.g., determining that an interruption even has ended); and code 818 for taking one or more action to communicate with a PLMN. The computer-readable medium/memory 812 optionally stores code 820 for receiving an indication of barred access attempts.

In certain aspects, the processor 804 has circuitry configured to implement the code stored in the computer-readable medium/memory 812. The processor 804 includes circuitry 822 for registering with a PLMN; circuitry 824 for determining (e.g., determining that an interruption even has ended); and circuitry 826 for taking one or more actions to communication with a PLMN. The computer-readable medium/memory 812 optionally stores circuitry 828 for receiving an indication barred access attempts.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5, or other operations for performing the various techniques discussed herein for network recovery. In certain aspects, computer-readable medium/memory 912 stores code 914 for registering (e.g., registering a plurality of UEs with a first PLMN); code 916 for determining (e.g., determining that an interruption even associated with a second PLMN has ended); and code 918 for taking one or more action (e.g., to facilitate registration of the plurality UEs with a second PLMN).

In certain aspects, the processor 904 has circuitry configured to implement the code stored in the computer-readable medium/memory 912. The processor 904 includes circuitry 920 for registering a plurality of UEs with a first PLMN; circuitry 922 for determining (e.g., determining that an interruption even associated with a second PLMN has ended); and circuitry 924 for taking one or more action (e.g., to facilitate registration of the plurality UEs with a second PLMN).

FIG. 10 illustrates a communications device 1000 that may include various components (e.g., corresponding to means-plus-function components) configured to perform operations for the techniques disclosed herein, such as the operations illustrated in FIG. 6. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 6, or other operations for performing the various techniques discussed herein for network recovery. In certain aspects, computer-readable medium/memory 1012 stores code 1014 for determining (e.g., determining that an interruption even associated with a first PLMN has ended); and code 1018 for taking one or more action (e.g., to register a plurality UEs with the first PLMN).

In certain aspects, the processor 1004 has circuitry configured to implement the code stored in the computer-readable medium/memory 1012. The processor 1004 includes circuitry 1020 for determining (e.g., determining that an interruption even associated with a first PLMN has ended); and circuitry 1022 for taking one or more action (e.g., to register a plurality UEs with the first PLMN).

Example Aspects

Aspect 1. A method for wireless communication by a user equipment (UE), comprising: registering with a first public land mobile network (PLMN) of a first network operator in response to detection of an interruption event associated with a second PLMN of a second network operator; determining that the interruption event has ended; and taking one or more actions to communicate with the second PLMN in response to the ending of the interruption event, wherein taking the one or more actions to communicate with the second PLMN is based on a constraint associated with access attempts to the second PLMN.

Aspect 2. The method of aspect 1, wherein the second PLMN comprises a home PLMN of the UE.

Aspect 3. The method of one of aspects 1-2, further comprising receiving an indication of barred access attempts to the second PLMN, wherein the one or more actions comprises determining to forgo the barred access attempts.

Aspect 4. The method of one of aspects 1-3, wherein the one or more actions comprise transmitting a request for registration with the second PLMN, and receiving a rejection of the request.

Aspect 5. The method of aspect 4, wherein receiving the rejection of the request comprises receiving a back-off timer indicating a period during which another request for registration is to be deferred.

Aspect 6. The method of one of aspects 1-5, wherein taking the one or more actions based on the constraint comprises waiting a randomized amount of time before attempting to register on the second PLMN.

Aspect 7. The method of aspect 6, wherein waiting the randomized amount of time is based on a hash function applied to an international mobile subscriber identity (IMSI) of the UE.

Aspect 8. A method for wireless communication by a network entity, comprising: registering a plurality of user equipments (UEs) with a first public land mobile network (PLMN) of a first network operator due to an interruption event associated with a second PLMN of a second network operator; determining that the interruption event has ended; and taking one or more actions to facilitate registration of the plurality of UEs with the second PLMN in response to the ending of the interruption event, wherein taking the one or more actions to facilitate the registration of the plurality of UEs is based on a constraint associated with access attempts to the second PLMN.

Aspect 9. The method of aspect 8, wherein the second PLMN comprises a home PLMN of the plurality of UEs.

Aspect 10. The method of one of aspects 8-9, wherein taking the one or more actions to facilitate the registration based on the constraint comprises transmitting an indication to at least one of the plurality of UEs at a different time than one or more other indications from one or more other PLMNs.

Aspect 11. The method of one of aspects 8-10, wherein taking the one or more actions comprises: determining a random time when an indication that the interruption event has ended to the plurality of UEs is to be transmitted; and transmitting the indication that the interruption event has ended at the determined random time.

Aspect 12. The method of one of aspects 8-11, wherein determining that the interruption event has ended comprises receiving, from the second PLMN, an indication that the interruption event has ended.

Aspect 13. The method of one of aspects 8-12, wherein taking the one or more actions to facilitate the registration based on the constraint comprises transmitting deregistration request messages to the plurality of UEs at different times.

Aspect 14. The method of aspect 13, wherein each of the deregistration request messages comprises a flag set to indicate that reregistration with the second PLMN is required.

Aspect 15. A method for wireless communication by a network entity, comprising: determining that an interruption event associated with a first public land mobile network (PLMN) of a first network operator has ended; and taking one or more actions to register a plurality of user equipments (UEs) with the first PLMN in response to the ending of the interruption event, wherein the plurality of UEs have registered with at least one second PLMN of a second network operator due to the interruption event, and wherein the one or more actions to register the plurality of UEs with the first PLMN is based on a constraint associated with access attempts to the first PLMN.

Aspect 16. The method of aspect 15, wherein the first PLMN comprises a home PLMN of the plurality of UEs.

Aspect 17. The method of one of aspects 15-16, wherein the one or more actions to register the plurality of UEs based on the constraint comprises transmitting an indication of barred access attempts.

Aspect 18. The method of one of aspects 15-17, wherein the one or more actions to register the plurality of UEs based on the constraint comprises receiving a request for registration with the first PLMN, and transmitting a rejection of the request due to the constraint.

Aspect 19. The method of aspect 18, wherein transmitting the rejection of the request comprises transmitting a back-off timer indicating a period during which another request for registration is to be deferred.

Aspect 20. The method of one of aspects 15-19, wherein: the at least one second PLMN comprises a plurality of PLMNs; and the one or more actions to register the plurality of UEs based on the constraint comprises sending an indication that the interruption event has ended to each of the plurality of PLMNs at different times.

Aspect 21. An apparatus, comprising: a memory comprising executable instructions; one or more processors configured to execute the executable instructions and cause the apparatus to perform a method in accordance with any one of aspects 1-20.

Aspect 22. An apparatus, comprising means for performing a method in accordance with any one of aspects 1-20.

Aspect 23. A non-transitory computer-readable medium comprising executable instructions that, when executed by one or more processors of an apparatus, cause the apparatus to perform a method in accordance with any one of aspects 1-20.

Aspect 24. A computer program product embodied on a computer-readable storage medium comprising code for performing a method in accordance with any one of aspects 1-20.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
registering with a first public land mobile network (PLMN) of a first network operator in response to detection of an interruption event associated with a second PLMN of a second network operator;
determining that the interruption event has ended; and
taking one or more actions to communicate with the second PLMN in response to the ending of the interruption event, wherein taking the one or more actions to communicate with the second PLMN is based on a constraint associated with access attempts to the second PLMN, wherein the constraint comprises a waiting time determined by the UE for the access attempts to the second PLMN, and wherein the waiting time starts after the ending of the interruption event.

2. The method of claim 1, wherein the second PLMN comprises a home PLMN of the UE.

3. The method of claim 1, further comprising receiving an indication of barred access attempts to the second PLMN, wherein the one or more actions comprises determining to forgo the barred access attempts.

4. The method of claim 1, wherein the one or more actions comprise transmitting a request for registration with the second PLMN, and receiving a rejection of the request.

5. The method of claim 4, wherein receiving the rejection of the request comprises receiving a back-off timer indicating a period during which another request for registration is to be deferred.

6. The method of claim 1, wherein taking the one or more actions based on the constraint comprises waiting a randomized amount of time before attempting to register on the second PLMN.

7. The method of claim 6, wherein waiting the randomized amount of time is based on a hash function applied to an international mobile subscriber identity (IMSI) of the UE.

8. A method for wireless communication by a network entity, comprising:
registering a plurality of user equipments (UEs) with a first public land mobile network (PLMN) of a first network operator due to an interruption event associated with a second PLMN of a second network operator;

determining that the interruption event has ended; and taking one or more actions to facilitate registration of the plurality of UEs with the second PLMN in response to the ending of the interruption event, wherein taking the one or more actions to facilitate the registration of the plurality of UEs is based on a constraint associated with access attempts to the second PLMN, wherein the constraint comprises a waiting time determined by one of the plurality of UEs to facilitate registration with the second PLMN, and wherein the waiting time starts after the ending of the interruption event.

9. The method of claim 8, wherein the second PLMN comprises a home PLMN of the plurality of UEs.

10. The method of claim 8, wherein taking the one or more actions to facilitate the registration based on the constraint comprises transmitting an indication to at least one of the plurality of UEs at a different time than one or more other indications from one or more other PLMNs.

11. The method of claim 8, wherein taking the one or more actions comprises:

determining a random time when an indication that the interruption event has ended to the plurality of UEs is to be transmitted; and transmitting the indication that the interruption event has ended at the determined random time.

12. The method of claim 8, wherein determining that the interruption event has ended comprises receiving, from the second PLMN, an indication that the interruption event has ended.

13. The method of claim 8, wherein taking the one or more actions to facilitate the registration based on the constraint comprises transmitting deregistration request messages to the plurality of UEs at different times.

14. The method of claim 13, wherein each of the deregistration request messages comprises a flag set to indicate that reregistration with the second PLMN is required.

15. A method for wireless communication by a network entity, comprising:

determining that an interruption event associated with a first public land mobile network (PLMN) of a first network operator has ended; and taking one or more actions to register a plurality of user equipments (UEs) with the first PLMN in response to the ending of the interruption event, wherein the plurality of UEs have registered with at least one second PLMN of a second network operator due to the interruption event, and wherein the one or more actions to register the plurality of UEs with the first PLMN is based on a constraint associated with access attempts to the first PLMN, wherein the constraint comprises a waiting time determined by one of the plurality of UEs to register with the first PLMN, and wherein the waiting time starts after the ending of the interruption event.

16. The method of claim 15, wherein the first PLMN comprises a home PLMN of the plurality of UEs.

17. The method of claim 15, wherein the one or more actions to register the plurality of UEs based on the constraint comprises transmitting an indication of barred access attempts.

18. The method of claim 15, wherein the one or more actions to register the plurality of UEs based on the constraint comprises receiving a request for registration with the first PLMN, and transmitting a rejection of the request due to the constraint.

19. The method of claim 18, wherein transmitting the rejection of the request comprises transmitting a back-off timer indicating a period during which another request for registration is to be deferred.

20. The method of claim 15, wherein:

the at least one second PLMN comprises a plurality of PLMNs; and the one or more actions to register the plurality of UEs based on the constraint comprises sending an indication to each of the plurality of PLMNs at different times.

21. An apparatus for wireless communication by a user equipment (UE), comprising:

a memory comprising instructions; and one or more processors configured, individually or in any combination, to execute the instructions and cause the apparatus to:

register with a first public land mobile network (PLMN) of a first network operator in response to detection of an interruption event associated with a second PLMN of a second network operator;

determine that the interruption event has ended; and take one or more actions to communicate with the second PLMN in response to the ending of the interruption event, wherein taking the one or more actions to communicate with the second PLMN is based on a constraint associated with access attempts to the second PLMN, wherein the constraint comprises a waiting time determined by the UE for the access attempts to the second PLMN, and wherein the waiting time starts after the ending of the interruption event.

22. The apparatus of claim 21, wherein the second PLMN comprises a home PLMN of the UE.

23. The apparatus of claim 21, wherein the one or more processors are configured, individually or in any combination, to execute the instructions and cause the apparatus to receive an indication of barred access attempts to the second PLMN, wherein the one or more actions comprises determining to forgo the barred access attempts.

24. The apparatus of claim 21, wherein the one or more actions comprise transmitting a request for registration with the second PLMN, and receiving a rejection of the request.

25. The apparatus of claim 24, wherein the receive comprises receive a back-off timer indicating a period during which another request for registration is to be deferred.

26. The apparatus of claim 21, wherein taking the one or more actions based on the constraint comprises waiting a randomized amount of time before attempting to register on the second PLMN.

27. The apparatus of claim 26, wherein waiting the randomized amount of time is based on a hash function applied to an international mobile subscriber identity (IMSI) of the UE.

28. An apparatus for wireless communication by a network entity, comprising:

a memory comprising instructions; and one or more processors configured, individually or in any combination, to execute the instructions and cause the apparatus to:

register a plurality of user equipments (UEs) with a first public land mobile network (PLMN) of a first network operator due to an interruption event associated with a second PLMN of a second network operator;

determine that the interruption event has ended; and take one or more actions to facilitate registration of the plurality of UEs with the second PLMN in response to the ending of the interruption event, wherein taking the one or more actions to facilitate the registration of the plurality of UEs is based on a constraint associated with access attempts to the second PLMN, wherein the constraint comprises a waiting time determined by one of the plurality of UEs to facilitate registration with the second PLMN, and wherein the waiting time starts after the ending of the interruption event.

29. The apparatus of claim 28, wherein the second PLMN comprises a home PLMN of the plurality of UEs.

30. The apparatus of claim 28, wherein taking the one or more actions to facilitate the registration based on the constraint comprises transmitting an indication to at least one of the plurality of UEs at a different time than one or more other indications from one or more other PLMNs.

* * * * *